(12) United States Patent
McLeod

(10) Patent No.: US 6,708,749 B2
(45) Date of Patent: Mar. 23, 2004

(54) APPARATUS FOR STRIPPING A COATING FROM AN OPTICAL FIBRE

(75) Inventor: Robert J. McLeod, Markham (CA)

(73) Assignee: KMD Technologies Inc., Markham (CA)

( * ) Notice: Subject to any disclaimer, the term of this patent is extended or adjusted under 35 U.S.C. 154(b) by 0 days.

(21) Appl. No.: 09/912,234

(22) Filed: Jul. 24, 2001

(65) Prior Publication Data

US 2002/0100552 A1 Aug. 1, 2002

Related U.S. Application Data

(60) Provisional application No. 60/264,771, filed on Jan. 29, 2001.

(51) Int. Cl.[7] .............................................. B32B 35/00
(52) U.S. Cl. ........................ 156/584; 156/344; 81/9.4; 81/9.41; 30/90.1; 30/346.53; 29/566.4; 7/107; 401/139; 401/265
(58) Field of Search ................. 156/344, 584; 81/9.4, 9.41; 30/90.1, 346.53; 29/566.4; 7/107; 401/139, 265

(56) References Cited

U.S. PATENT DOCUMENTS

| | | | |
|---|---|---|---|
| 3,361,015 A | 1/1968 | Matthews | |
| 3,398,610 A | 8/1968 | Matthews | |
| 3,433,106 A | 3/1969 | Matthews | |
| 3,535,785 A | 10/1970 | Matthews | |
| 4,059,892 A | * 11/1977 | Siden | 30/90.1 |
| 4,485,696 A | * 12/1984 | Bieganski | 81/9.41 |
| 4,748,871 A | * 6/1988 | Zdzislaw | 81/9.4 |
| D301,970 S | 7/1989 | Matthews | |
| 4,945,788 A | 8/1990 | Matthews | |
| 4,955,137 A | 9/1990 | Matthews | |
| 4,981,032 A | * 1/1991 | Chen | 72/409.14 |
| 5,481,638 A | * 1/1996 | Roll et al. | 385/134 |
| 5,713,249 A | * 2/1998 | Liversidge | 81/9.43 |
| 5,893,302 A | * 4/1999 | Strom | 81/9.51 |
| 6,253,641 B1 | * 7/2001 | Tarpill | 81/9.44 |
| 6,273,990 B1 | * 8/2001 | Bookbinder et al. | 156/344 |
| 6,477,776 B1 | * 11/2002 | Jee | 30/90.1 |
| 6,588,039 B1 | * 7/2003 | Bates | 7/107 |

FOREIGN PATENT DOCUMENTS

CA   2 382 123   4/2001

OTHER PUBLICATIONS

Blade Replacement Instructions, Cablematic, Ripley Company, 12/95.
Blade Replacement Instructions, Cablematic, Ripley Company, 5/99.
Furukawa Electric—Optical Fiber Cleavers and Stripping Tools, believed to be available prior to the filing of the instant application.

* cited by examiner

*Primary Examiner*—Mark A. Osele
(74) *Attorney, Agent, or Firm*—Fredrikson & Byron, P.A.

(57) ABSTRACT

Apparatus for stripping a coating from a coated optical fiber. The apparatus has a pair of opposed blade holders, one end of each blade holder being adapted to releasably receive and retain a blade. The opposed ends of the blade holders are joined with a flexible member. The opposed blade holders are movable from an open position to a closed position. In the closed position edges of the blades are in a parallel spaced apart position, spaced to grip a coated optical fiber between the plastic blades. The plastic blades are selected and positioned to grip and to effect cracking of the coating while minimizing damage to the optical fiber when a coated optical fiber is placed and moved between the closed blades.

26 Claims, 3 Drawing Sheets

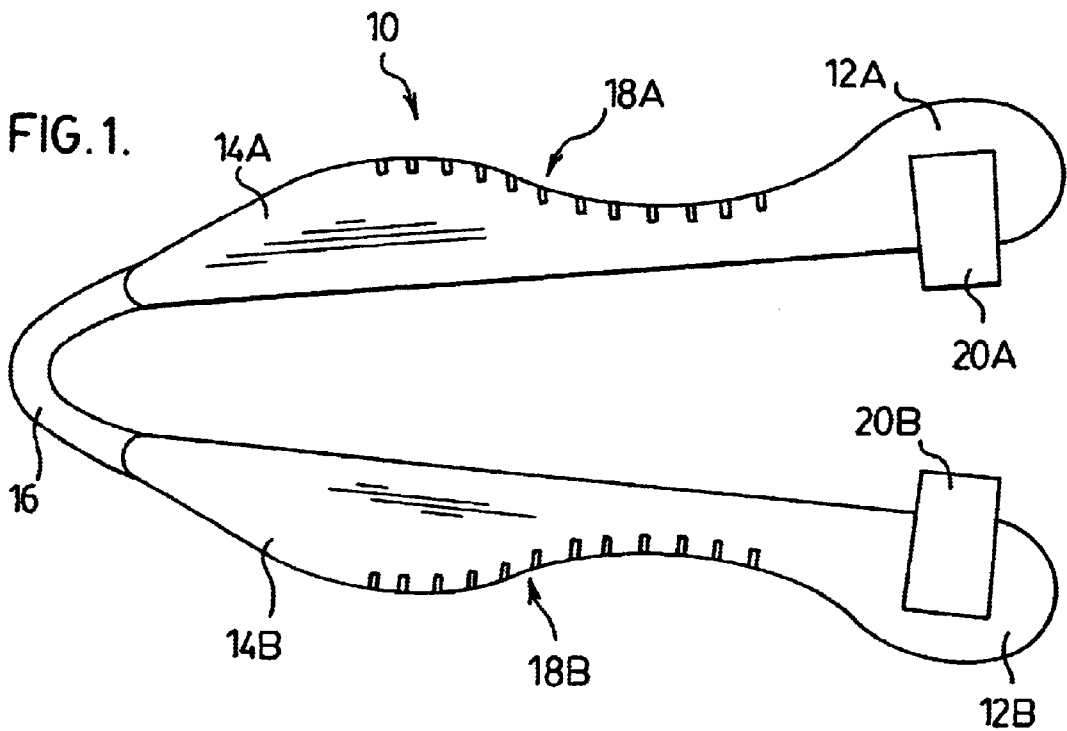
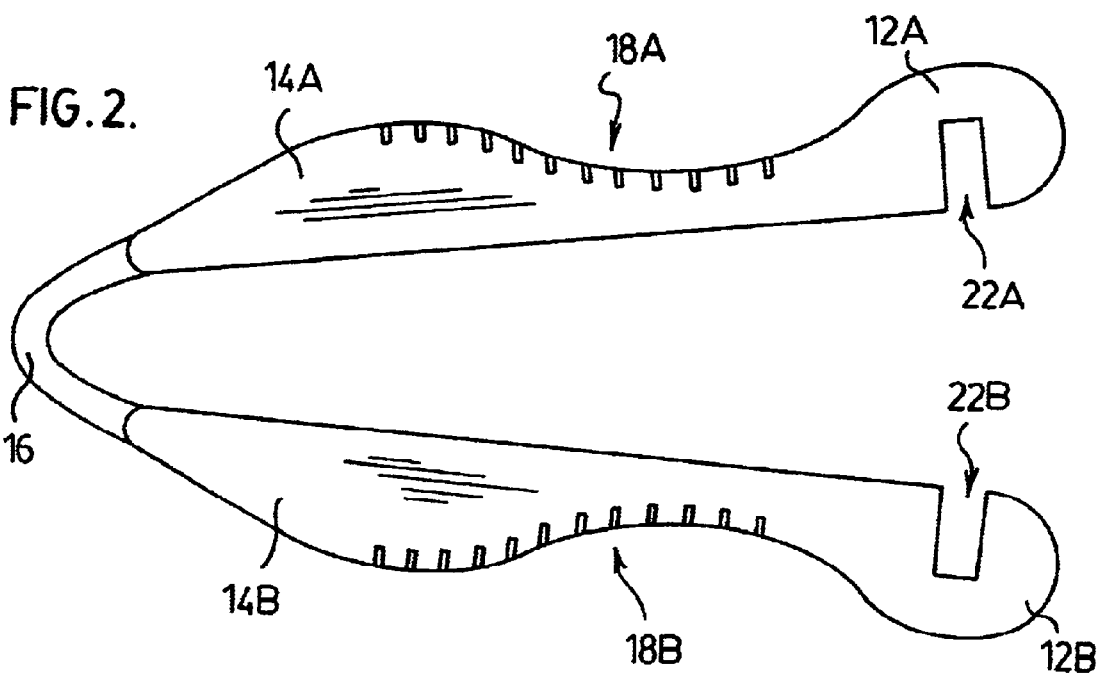

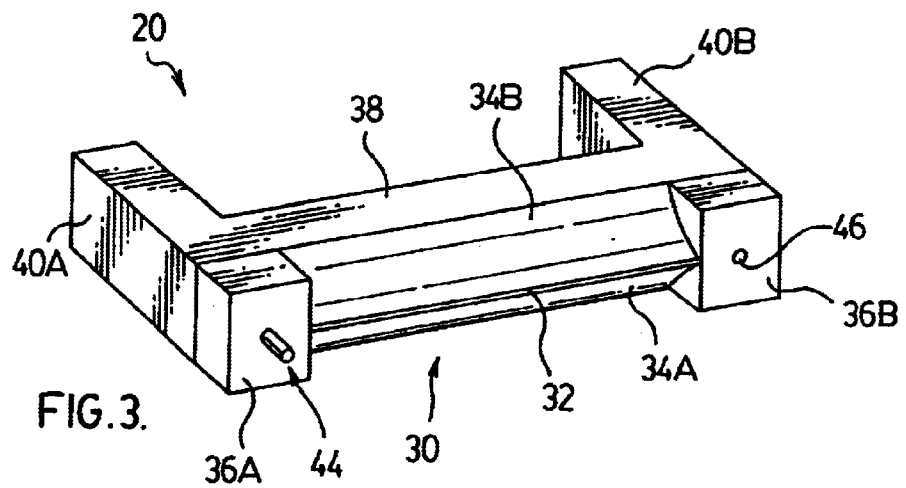
FIG. 3.
FIG. 4.
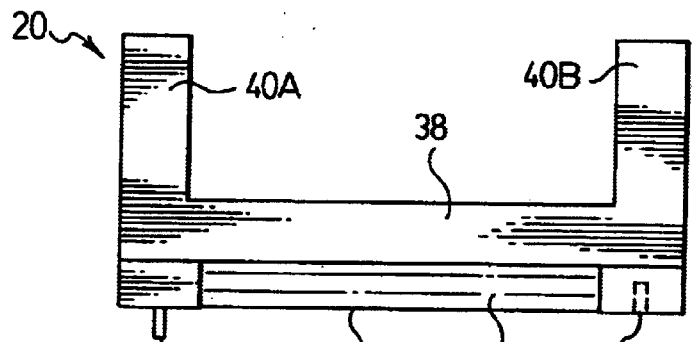
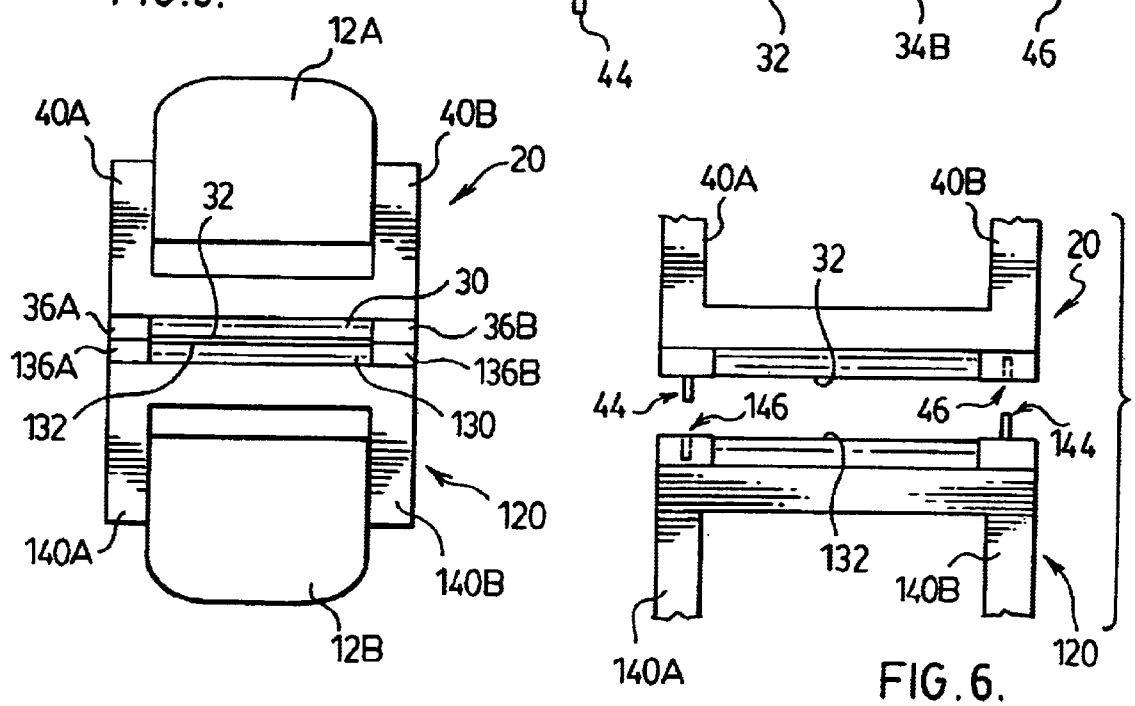
FIG. 5.
FIG. 6.

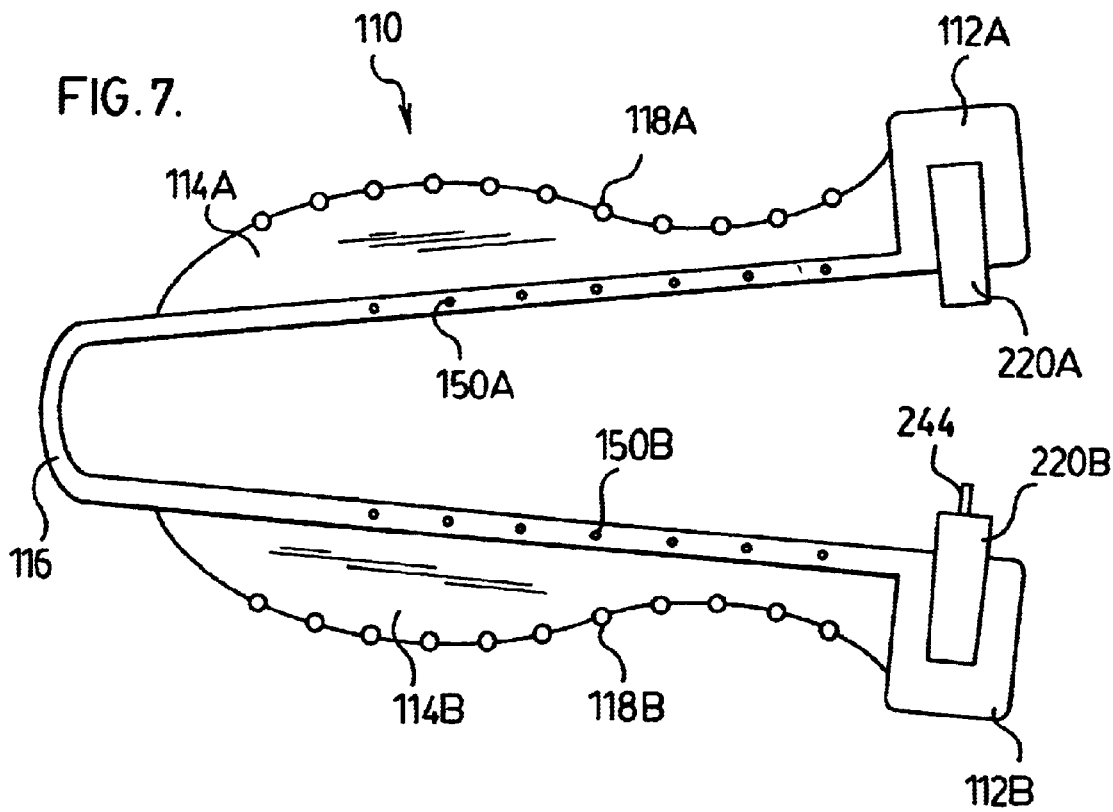
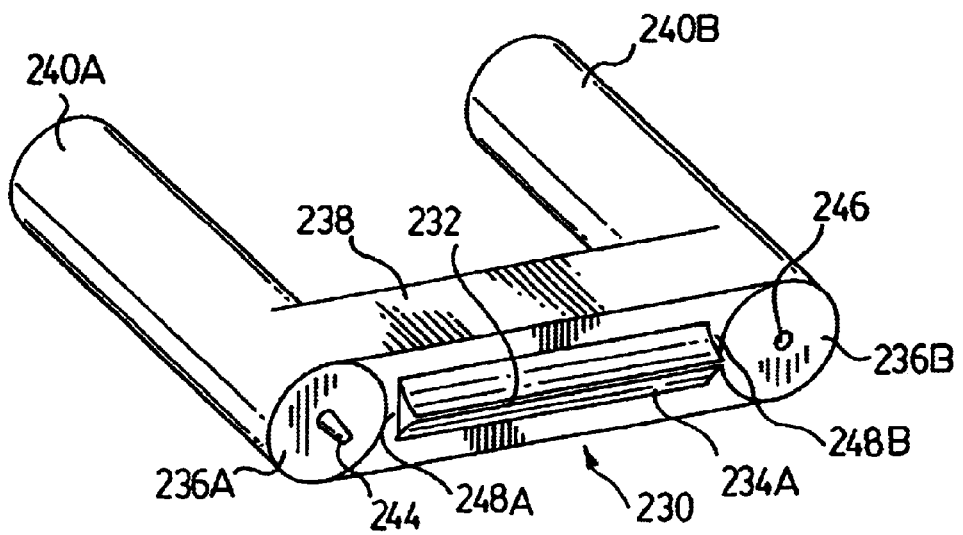

APPARATUS FOR STRIPPING A COATING FROM AN OPTICAL FIBRE

This application claims benefit of provisional application 60/264,771 filed Jan. 29, 2001.

FIELD OF THE INVENTION

The present invention relates to apparatus for stripping a coating from an optical fibre, and especially to a hand-held apparatus that uses interchangeable plastic blades in a manner to minimize damage to the optical fibre. The apparatus is preferably of an ergonomic design, so that it may be comfortably held in the hand during use. Alternatively, the apparatus may be intended to stand on a bench.

BACKGROUND TO THE INVENTION

Optical fibres are widely used for the transmission of information, and such use is rapidly increasing. Networks of optical fibres have been installed in many locations, and continue to be installed. It is anticipated that optical fibres will make conductors e.g. copper, obsolete in many end-uses.

Optical fibres are glass fibres that are coated, to reduce loss of optical signals being transmitted by the fibre. Although of considerable length, optical fibres are of a finite length, and it is necessary to join the fibres end-to-end i.e. splice the fibres, to another optical fibre. In other instances, it is necessary to join the fibres to a connector or other device. The coating on the glass fibre interferes with the joining of fibres, and must be removed before joining may be effected.

The coating is typically an acrylic coating, which has adequate strength properties for use on the optical fibre but is nonetheless a brittle coating. Thus, it is possible to crack or otherwise damage the coating and to then remove the coating from the fibre by scraping. This is the technique that is used to strip the coating from the glass fibre.

Apparatus for removal of a coating from an optical fibre is known. The most common form of the apparatus resembles apparatus for stripping a plastic overlayer from an electrical conductor. The apparatus is formed from a metal, probably steel, and generally resembles a pair of pliers, and has a V-shaped notch in a set of metal jaws. The V-shaped notch has a semicircular rounded hole at the peak of the V in which the fibre rests. The jaws are movable about a pivot, the other part of the apparatus being separate portions of a handle. The coated optical fibre must be carefully placed in the rounded hole of the notch and perpendicular to the jaws, and drawn through to strip the coating. The nature of the jaws and the need to carefully locate optical fibre within the rounded hole of the V-shaped notch are disadvantages of such an apparatus. The apparatus is not adjustable to accommodate fibres of different diameters i.e. the user locates fibres of all diameters in the same V-shaped notch. Thus, care must be taken not to damage the glass fibre portion of the optical fibre.

An improved apparatus for removal of coatings from optical fibres would be beneficial to the industry. Such apparatus should be effective, user friendly and preferably less prone to causing damage to the glass fibre of the optical fibre during stripping of the coating.

SUMMARY OF THE INVENTION

An apparatus for stripping a coating from an optical fibre has now been found.

Accordingly, the present invention provides apparatus for stripping a coating from an optical fibre, comprising:

a pair of opposed blade holders, one end of each blade holder being adapted to releasably receive and retain a blade, the opposed ends of said blade holders being joined;

a plastic blade for each blade holder;

said opposed blade holders being movable from an open position to a closed position, such that in the closed position edges of the blades are in a parallel spaced apart position, spaced to grip a coated optical fibre between said plastic blades;

said plastic blades being selected and positioned to grip and to effect cracking or fracturing of the coating when a coated optical fibre is placed and moved between the closed blades.

BRIEF DESCRIPTION OF THE DRAWINGS

The present invention is illustrated by the embodiments shown in the drawings, in which:

FIG. 1 is a schematic representation of an embodiment of the apparatus of the present invention, in side view;

FIG. 2 is a schematic representation of the apparatus of FIG. 1, without blades;

FIG. 3 is a schematic representation of a perspective view of an embodiment of a blade;

FIG. 4 is a schematic representation of a plan view of the blade of FIG. 3;

FIG. 5 is a schematic representation of a front view of the apparatus of FIG. 1 in a closed position, without optical fibre;

FIG. 6 is a schematic representation of a front view, in part, of an embodiment of two blades spaced apart, showing piloting of the blades;

FIG. 7 is a schematic representation of an alternate embodiment of the apparatus of the present invention, in side view; and FIG. 8 is a schematic representation of a perspective view of an alternate embodiment of a blade.

DETAILED DESCRIPTION OF THE INVENTION

The present invention relates to apparatus for stripping a coating from an optical fibre. As discussed above, optical fibres having a coating, typically an acrylic coating, on the glass fibre that is used for transmission of information. The coating must be removed for splicing of the glass fibres and for connecting the glass fibres to devices. Damage to the glass fibre during removal of the coating from the optical fibre is to be avoided. The apparatus of the invention has a pair of opposed blade holders, one end of each blade holder being adapted to releasably receive and retain a blade. The opposed ends of the blade holders are joined. The blade holders are adapted to receive a plastic blade, preferably in a dedicated slot. The opposed blade holders are movable from an open position to a closed position, such that in the closed position edges of the blades are in a parallel spaced apart position, spaced apart so as to grip the optical fibre between the plastic blades. The plastic blades are selected and positioned to grip and to effect cracking or fracturing, or similar effects, of the coating with minimal damage to the optical fibre when an optical fibre is placed and moved between the closed blades.

FIGS. 1 and 2 show an apparatus of the present invention, generally indicated by 10. Apparatus 10 has a pair of opposed heads, 12A and 12B, which are attached to body sections 14A and 14B, respectively. Flexible member 16 connects body sections 14A and 14B. Apparatus 10 is intended to be hand-held during use i.e. it is not placed on a surface during use.

In the embodiment shown, body sections 14A and 14B are integral with flexible member 16, which is preferred. However, it is understood that body section 14A and 14B could be joined by other means, including a separate bendable section. Flexible member 16 is intended to be sufficiently flexible to permit heads 12A and 12B to be moved by hand into an adjacent position i.e. closed. However, it is intended that flexible member 16 urge heads 12A and 12B toward an open position. It is most convenient to form the apparatus consisting of heads 12A and 12B, body sections 14A and 14B and flexible member 16 as a one-piece integrally moulded section. The apparatus of the invention does not have a hinge or elbow section with a spring, to bias the heads of the apparatus into an open position.

Body sections 14A and 14B are shown as having grooves 18A and 18B. Grooves 18A and 18B are not essential but are part of the preferred ergonomic design of body sections 14A and 14B. In particular, the ergonomic design is intended to make the holding and use of apparatus 10 as being comfortable to the user's hands during use.

Heads 12A and 12B are shown as having blades 20A and 20B, which are discussed below. Body sections 14A and 14B are movable about flexible member 16 so that blades 20A and 20B come into contact, as also discussed below.

FIG. 2 shows head 12A and 12B without blades 20A and 20B. Head 12A has slot 22A and head 12B has slot 22B. Slots 22A and 22B are intended to be dedicated slots that receive and retain blades 20A and 20B, respectively. Blades 20A and 20B are of a shape that permits the blades to be inserted and retained in slots 22A and 22B during use, but which permits the blades to be readily removed for replacement.

FIG. 3 is a perspective view of a blade 20 of the apparatus of the present invention. Blade 20 has blade section 30, with blade edge 32. Blade sections 34A and 34B slope away from blade edge 32, so as to form blade edge 32. Blade section 30 is not in the shape of a chisel blade. It is to be understood that blade edge 32 is not a sharp edge, but rather has a flat or rounded edge, to minimize damage to the optical fibre during use. Moreover, any portion of blade edge 32 may be used in removal of the coating, and in use it is not necessary to place the optical fibre in any particular position across the width of the blade. Blade edge 32 is preferably centrally located on blade section 30.

Blade section 30 is located between blade section abutments 36A and 36B. Blade section abutments 36A and 36B are used in the spacing of a blade edge 32 of one blade 20 from a corresponding blade edge of another blade (see FIG. 5). Blade section abutments 36A and 36B are shown as having pilot rod 44 and pilot orifice 46, respectively. The use of pilot rod 44 and pilot orifice 46 is described below.

Blade section 30 is attached to or forms part of blade base 38, which has blade arms 40A and 40B. It is understood that blade section 30 and blade base 38 preferably are an integral section i.e. formed as one piece, or blade section 30 could be attached to blade base 38. In particular, blade 20 should be formed as a single piece i.e. integrally moulded as one piece. Blade arms 40A and 40B are used in the attachment of a blade to head 12 of apparatus 10. Blade arms 40A and 40B are located in head 12 using a press or friction fit to effect attachment and retention of blade 20 in head 12 of apparatus 10. In the insertion of blades into head 12, it is not necessary to fully insert the blades by hand as this may be achieved on closing the apparatus. At that time, the blades would be moved into head 12, if necessary, in order to properly seat and align the blades so that the blade edges are parallel. This is accomplished by contact between the blade section abutments of opposed blades in the apparatus.

FIG. 4 shows a plan view of blade 20 as illustrated in FIG. 3.

FIG. 5 shows a front view of the apparatus 10 of FIG. 1 with heads 12A and 12B in a closed position. Head 12A is shown as having blade 20, and correspondingly head 12B is shown as having a blade 120. In the closed position, blades 20 and 120 are in juxtaposed position. In particular, blade section abutment 36A of blade 20 is in contact with the corresponding blade section abutment 136A of blade 120. Similarly, blade section abutment 36B of blade 20 is contact with the corresponding blade section 136B of blade 120.

Blade edge 32 of blade 20 is shown as spaced from blade edge 132 of blade 120. The spacing shown has been exaggerated for clarity. In particular, blade edge 32 is recessed from the outer surface of blade section abutments 36A and 36B. The gap between blade edge 32 and blade edge 132 may be varied, but it cannot be greater than the diameter of the coated optical fibre. In preferred embodiments, the gap is not less than the diameter of the glass fibre of the optical fibre.

As the blades of the apparatus are interchangeable, it is understood that blades could be provided with varying gaps in use. This would accommodate optical fibres of different diameters. The most common optical fibre has a glass fibre of a diameter of about 125 microns, with the outer diameter of the coated optical fibre being about 250 microns. Thus, in embodiments of the present invention, the gap between blade edge 32 and blade edge 132 would be not less than 125 microns and not greater than 250 microns.

In the embodiment of FIG. 5, arms 40A and 40B of blade 20 correspond to 140A and 140B of blade 120.

FIG. 6 shows, in part, an embodiment of a front view of apparatus 10 with blades 20 and 120 in a spaced apart position. Blade 20 is shown as having pilot rod 44 and pilot orifice 46. Correspondingly, blade 120 has pilot orifice 146 opposite pilot rod 44 and pilot rod 144 opposite pilot orifice 46. Pilot rod 44 is received in pilot orifice 146, and correspondingly pilot rod 144 is received in pilot orifice 46 when blades 20 and 120 are brought together. The preferred embodiment involving use of pilot rods and pilot orifices assists in bringing blades 20 and 120 together in a parallel relationship so that knife edges 32 and 132 are aligned in a parallel spaced apart arrangement.

The blades are inserted into the apparatus using a press fit, as described above, and may be removed by applying outward pressure to the arms of the blades. This permits rapid and convenient insertion and removal of blades. The use of screws in the head of the apparatus and corresponding slots in the blades is avoided. In embodiments of the invention, the blades and blade slots could be designed so that the blades can only be inserted in one orientation. This would eliminate the need to ensure that piloting rods on opposed blades were on opposite sides of the apparatus.

The blade is recessed from the blade abutment. Blades with different amounts of recess could be provided, and readily installed and replaced, so as to permit the apparatus to be used with optical fibres of different diameters.

FIG. 7 shows an alternate embodiment of the apparatus of the present invention, generally indicated by 110. Apparatus 110 has a pair of opposed heads, 112A and 112B, which are attached to body sections 114A and 114B, respectively. Flexible member 116 connects body sections 114A and 114B, with body sections 114A and 114B being integral with flexible member 116. As discussed with respect to the embodiment discussed above, apparatus 110 is intended to be hand-held during use. Flexible member 116 urges heads 112A and 112B toward an open position, but is sufficiently flexible to permit heads 112A and 112B to be readily moved by hand into an adjacent position i.e. closed. It is most convenient to form apparatus 110 consisting of heads 112A and 112B, body sections 114A and 114B and flexible member 116 as a one-piece integrally moulded section.

Body sections 114A and 114B are shown as having raised ribs 118A and 118B. Ribs 118A and 118B are preferred, being part of an ergonomic design intended to make the holding and use of apparatus 110 more comfortable to the user's hands during use. In addition, body sections 114A and 114B have markers 150A and 150B, which would normally be equally spaced to assist the user in determining the length of coating being stripped from the optical fibre and for consistency in removal of lengths of coating from the ends of optical fibres. It is understood that at least one of body sections 114A and 114B would have such markers, preferably both of the body sections having markers. In a preferred embodiment, the first marker may be conveniently spaced at 1 cm from the centre of the blade i.e. to indicate that 1 cm of coating would be stripped from the optical fibre, and subsequent markers conveniently located at intervals of 0.5 cm. Such spacing is preferred, although other spacings of markers could be used.

Heads 112A and 112B are shown as having blades 220A and 220B, which are discussed below. Body sections 114A and 114B are movable about flexible member 116 so that blades 220A and 220B come into contact, as also discussed below.

FIG. 8 is a perspective view of blade 220. Blade 220 has blade section 230, with blade edge 232. Blade sections 234A and 234B slope away from blade edge 232, so as to form blade edge 232. Blade section 230 is not in the shape of a chisel blade. As discussed above, blade edge 232 is not a sharp edge, but rather has a flat or rounded edge, to minimize damage to the optical fibre during use. As above, any portion of blade edge 232 may be used in removal of the coating, and in use it is not necessary to place the optical fibre in any particular position across the width of the blade.

Blade section 230 is located between blade section abutments 236A and 236B, the blade section abutments being shown with rounded edges. Blade edge 232 is preferably centrally located on blade section 230, and is shown as spaced from blade section abutments 236A and 236B at spaces 248A and 248B. Blade section abutments 236A and 236B are used in the spacing of a blade edge 232 of one blade 220 from a corresponding blade edge of another blade, in the manner discussed above with respect to FIG. 5. Blade section abutments 236A and 236B are shown as having pilot rod 244 and pilot orifice 246, respectively. The use of pilot rod 244 and pilot orifice 246 is described above.

Blade section 230 forms part of blade base 238, which has blade arms 240A and 240B, both of which are shown with rounded edges. Blade section 230 and blade base 238 are shown as an integral section. Blade arms 240A and 240B are used in the attachment of a blade to head 112 of apparatus 110. Blade arms 240A and 240B are located in head 12 or 112 using a press or friction fit to effect attachment and retention of blade 220 in head 12 or 112 of apparatus 10 or 110. As discussed above, it is not necessary to fully insert the blades by hand as this may be achieved on closing the apparatus. At that time, the blades would be moved into head 12 or 112, if necessary, in order to properly seat and align the blades so that the blade edges are parallel. This is accomplished by contact between the blade section abutments of opposed blades in the apparatus.

In use in its preferred embodiment, the apparatus is held in the hand of the user. A coated optical fibre is placed between the open heads of the apparatus, with the fibre being located at the position necessary for removal of the coating. The user applies hand pressure to the opposed body sections of the apparatus, to cause the heads of the apparatus to be brought together until the abutment sections come into contact. The recessed nature of the blades is such that the blades contact the coated optical fibre, and it is believed that the coating cracks or fractures at this time. Pulling of the fibre between the blades effects cracking or fracturing of the coating as the fibre is moved, and the removal of the coating. The user then releases the hand pressure, and removes the fibre with coating stripped off. It might be necessary to wipe fragments of coating off the fibre and/or apparatus of the invention.

In an alternate embodiment of the invention, the apparatus is intended to be located on a bench or other surface. In this form, it would be used in the same manner as described above, except it would not be a hand-held apparatus.

The apparatus of the present invention removes coatings from optical fibres. Such coatings are believed to typically be acrylic coatings. The blades may be selected so that damage to the glass fibre of the optical fibre is avoided or minimized. The blades are preferably formed from a resin that is sufficiently hard to cause cracking of the coating during use, while being sufficiently soft to at least minimize damage to the glass optical fibre. A preferred resin is an acrylic resin. The blades are not metal.

The preferred method of manufacture of the head, body and flexible member as well as the blades is an injection moulding process. Preferably, the head, body and flexible member is unitary. Similarly, preferably, the blade is unitary.

What is claimed is:

1. Apparatus for stripping a coating from a coated optical fibre, comprising:

a pair of opposed blade holders, opposed ends of the blade holders being joined such that the opposed blade holders are movable from an open position to a closed position; and a plastic blade for each blade holder, wherein each plastic blade has a blade section located between a pair of blade section abutments, each blade section having a blade edge, whereby, in the closed position, the pair of blade section abutments of one plastic blade is in contact with the pair of blade section abutments of the other plastic blade such that the blade edge of one plastic blade and the blade edge of the other plastic blade are in a spaced apart position, spaced to grip a coated optical fibre between the plastic blades, the plastic blades being selected and positioned to grip and to effect cracking or fracturing of the coating of the optical fibre when a coated optical fibre is placed and moved between the closed blades.

2. The apparatus of claim 1 in which the blades are spaced apart by less than the diameter of the coated optical fibre.

3. The apparatus of claim 2 in which at least one of the blade holders has markers indicating length of coating being stripped from the optical fibre.

4. The apparatus of claim 3 in which there is a marker spaced at 1 cm from the plastic blade and additional markers spaced at intervals of 0.5 cm.

5. The apparatus of claim 1 in which the blades are received and retained in dedicated slots in the blade holder.

6. The apparatus of claim 5 in which the blades are received and retained in the dedicated slots in a press fit.

7. The apparatus of claim 6 in which the press fit includes moving the blade holders to a closed position.

8. The apparatus of claim 5 in which one blade is piloted into location with the other blade when the blade holders are urged to a closed position.

9. The apparatus of claim 5 in which the blades are retained in a blade receptacle, the blade receptacle being releasably received and retained by the blade holder.

10. The apparatus of claim 9 in which the respective blade receptacles are piloted into location when the blade holders are urged to a closed position.

11. The apparatus of claim 9 in which the blade receptacles effect the positioning of the edges in a parallel spaced apart relationship.

12. The apparatus of claim 9 in which, when closed, the blades are spaced apart by not less than the diameter of the glass fibre of the optical fibre.

13. The apparatus of claim 1 in which one end of each blade holder is adapted to releasably receive and retain the blade.

14. The apparatus of claim 1 in which the opposed ends of the blade holders are joined such that the opposed blade holders are biased to the open position.

15. The apparatus of claim 1 in which the blade edge of one plastic blade and the blade edge of the other plastic blade are in a parallel spaced apart position.

16. The apparatus of claim 1 in which the opposed ends of the blade holders are joined by a flexible member.

17. The apparatus of claim 16 in which the flexible member is integral with the opposed ends of the blade holders.

18. The apparatus of claim 1 in which one blade section abutment of the pair of blade section abutments has a pilot rod and the other blade section abutment has a pilot orifice, whereby, in the closed position, the pilot rod of each pair of blade section abutments is received in the pilot orifice of each pair of opposed blade section abutments.

19. Apparatus for stripping a coating from a coated optical fibre, comprising:

a pair of opposed blade holders, one end of each blade holder being adapted to releasably receive and retain a blade, opposed ends of the blade holders being joined by a flexible member such that the opposed blade holders are biased towards an open position;

a plastic blade for each blade holder;

the opposed blade holders being movable from the open position to a closed position, such that, in the closed position, edges of the blades are in a parallel spaced apart position, spaced to grip a coated optical fibre between the plastic blades;

the plastic blades being selected and positioned to grip and to effect cracking or fracturing of the coating of the optical fibre when a coated optical fibre is placed and moved between the closed blades.

20. The apparatus of claim 19 in which the blades are spaced apart by less than the diameter of the coated optical fibre.

21. The apparatus of claim 19 in which the blades are received and retained in dedicated slots in the blade holder.

22. The apparatus of claim 21 in which the blades are retained in a blade receptacle, the blade receptacle being releasably received and retained by the blade holder.

23. The apparatus of claim 22 in which the blade receptacles effect the positioning of the edges in a parallel spaced apart relationship.

24. The apparatus of claim 19 in which, when closed, the blades are spaced apart by not less than the diameter of the glass fibre of the optical fibre.

25. The apparatus of claim 19 in which the flexible member is integral with the opposed ends of the blade holders.

26. Apparatus for stripping a coating from a coated optical fibre, comprising:

a pair of opposed blade holders, one end of each blade holder being adapted to releasably receive and retain a blade, opposed ends of the blade holders being joined such that the opposed blade holders are biased towards an open position and the opposed blade holders are movable from an open position to a closed position; and a plastic blade for each blade holder, wherein each plastic blade has a blade section located between a pair of blade section abutments, each blade section having a blade edge and each pair of blade section abutments having one blade section abutment having a pilot rod and the other blade section abutment having a pilot orifice, whereby, in the closed position, the pilot rod of each pair of blade section abutments is received in the pilot orifice of each pair of opposed blade section abutments such that the blade edge of one plastic blade and the blade edge of the other plastic blade are in a parallel spaced apart position, spaced to grip a coated optical fibre between the plastic blades the plastic blades being selected and positioned to grip and to effect cracking or fracturing of the coating of the optical fibre when a coated optical fibre is placed and moved between the closed blades.

* * * * *